US012528146B2

(12) United States Patent
Chen et al.

(10) Patent No.: US 12,528,146 B2
(45) Date of Patent: Jan. 20, 2026

(54) METHOD FOR FACILITATING ANALYSIS OF CAUSES OF MACHINING DEFECTS

(71) Applicant: INDUSTRIAL TECHNOLOGY RESEARCH INSTITUTE, Hsinchu (TW)

(72) Inventors: Chun-Ting Chen, Taichung (TW); Jheng-Jie Lin, Taichung (TW); Chien-Chih Liao, Taichung (TW); Jen-Ji Wang, Lukang Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 645 days.

(21) Appl. No.: 18/067,904

(22) Filed: Dec. 19, 2022

(65) Prior Publication Data

US 2024/0157496 A1 May 16, 2024

(30) Foreign Application Priority Data

Nov. 14, 2022 (TW) ................................. 111143374

(51) Int. Cl.
*B23Q 17/09* (2006.01)
*B23Q 17/12* (2006.01)
(52) U.S. Cl.
CPC ......... *B23Q 17/0971* (2013.01); *B23Q 17/12* (2013.01)
(58) Field of Classification Search
CPC .................................................. B23Q 17/0971
See application file for complete search history.

(56) References Cited

U.S. PATENT DOCUMENTS

| 4,087,801 A * | 5/1978 | Noh ................... G05B 19/4065 73/104 |
| 5,364,083 A | 11/1994 | Ross et al. |

(Continued)

FOREIGN PATENT DOCUMENTS

| CN | 1078519 C | 1/2002 |
| CN | 102478825 A | 5/2012 |

(Continued)

OTHER PUBLICATIONS

Taiwanese Office Action and Search Report for Taiwanese Application No. 111143374, dated Jul. 6, 2023.

(Continued)

*Primary Examiner* — Travis R Hunnings
(74) *Attorney, Agent, or Firm* — Birch, Stewart, Kolasch & Birch, LLP

(57) ABSTRACT

A method for facilitating analysis of causes of machining defects is provided. The method is carried out by a computer system. The method includes the step of obtaining motion data and vibration acceleration data about the tip of a cutter mounted on a machine tool. The method further includes the step of obtaining time-frequency information about the vibration acceleration data by performing a time-frequency analysis on the vibration acceleration data. The method further includes the step of obtaining vibration-displacement data by normalizing the time-frequency information. The method further includes the step of obtaining amplitude-distribution data about the tip by synchronizing the motion data and the vibration-displacement data.

5 Claims, 4 Drawing Sheets

(56) References Cited

U.S. PATENT DOCUMENTS

| | | |
|---|---|---|
| 8,977,523 B2 | 3/2015 | Ertas et al. |
| 10,814,417 B2 | 10/2020 | Boccadoro et al. |
| 2007/0020065 A1 | 1/2007 | Kirby |
| 2009/0128187 A1 | 5/2009 | Kajiyama et al. |
| 2012/0095724 A1* | 4/2012 | Ando ............... B23Q 17/12 702/145 |
| 2012/0253708 A1* | 10/2012 | Tanaka ............ B23Q 11/0039 702/56 |
| 2013/0164092 A1* | 6/2013 | Kondo ............. B23Q 17/0976 702/56 |
| 2013/0211573 A1* | 8/2013 | Wang ............... B23Q 17/0971 700/175 |
| 2016/0124014 A1 | 5/2016 | King et al. |
| 2016/0229015 A1* | 8/2016 | Takahashi ........ B23Q 17/0976 |
| 2018/0088552 A1 | 3/2018 | Dow et al. |
| 2018/0284743 A1 | 10/2018 | Cella et al. |
| 2019/0048988 A1* | 2/2019 | Besser ............... H02K 11/35 |
| 2019/0160619 A1* | 5/2019 | Lin .................. B23Q 17/0961 |
| 2019/0299352 A1* | 10/2019 | Michiwaki ............ B23B 51/00 |
| 2019/0391059 A1 | 12/2019 | Miyake et al. |
| 2020/0057430 A1* | 2/2020 | Kettemer ........... G05B 19/4185 |
| 2020/0272122 A1* | 8/2020 | Oikawa ............. G05B 19/4065 |
| 2021/0086267 A1* | 3/2021 | Hayashi ............... B23Q 15/12 |

FOREIGN PATENT DOCUMENTS

| | | |
|---|---|---|
| CN | 112395809 A | 2/2021 |
| CN | 114846420 A | 8/2022 |
| JP | 5366840 B2 | 12/2013 |
| JP | 5762166 B2 | 8/2015 |
| JP | 6571565 B2 | 9/2019 |
| JP | 6833118 B1 | 2/2021 |
| TW | 200700948 A | 1/2007 |
| TW | I412737 B | 10/2013 |
| TW | I510874 B | 12/2015 |
| TW | 202046036 A | 12/2020 |
| WO | WO 2014/115395 A1 | 7/2014 |
| WO | WO 2022/153937 A1 | 7/2022 |

OTHER PUBLICATIONS

Ellinger et al., "Feed Drive Condition Monitoring Using Modal Parameters", MM Science Journal, Nov. 2019, pp. 3206-3213.

* cited by examiner

METHOD FOR FACILITATING ANALYSIS OF CAUSES OF MACHINING DEFECTS

CROSS REFERENCE TO RELATED APPLICATIONS

This Application claims priority of Taiwan Patent Application No. 111143374, filed on Nov. 14, 2022, the entirety of which is incorporated by reference herein.

BACKGROUND OF THE DISCLOSURE

Field of the Disclosure

The present disclosure relates in general to machining quality management, and in particular to a method for facilitating the analysis of the causes of machining defects.

Description of the Related Art

Any cutting defects caused by machining equipment can affect the product's delivery date as requested by the client, potentially causing a significant reduction in production efficiency. Therefore, the production end needs to quickly identify the causes of the defects on the cutting surface in order to eliminate the problem. Currently, the cause of most defects is determined by technicians, based on their experience and often using a trial-and-error approach, so on-site machining defects cannot be addressed immediately.

Therefore, it would be desirable to have a method for facilitating the analysis of the causes of machining defects to assist in solving the above-mentioned problems.

BRIEF SUMMARY OF THE DISCLOSURE

There are many types of causes that lead to defects on the surface of a workpiece. Examples of these causes include the machining path of computer-aided manufacturing (CAM), the position command (POSC), servo position errors, and cutter-tip vibration (i.e., when the tip of the cutter vibrates). The present disclosure focuses on assisting in determining whether the defect on the surface of a workpiece is caused by cutter-tip vibration.

An embodiment of the present disclosure provides a method for facilitating analysis of causes of machining defects. The method is carried out by a computer system. The method includes the step of obtaining motion data and vibration acceleration data about the tip of a cutter mounted on a machine tool. The method further includes the step of obtaining time-frequency information about the vibration acceleration data by performing a time-frequency analysis on the vibration acceleration data. The method further includes the step of obtaining vibration-displacement data by normalizing the time-frequency information. The method further includes the step of obtaining amplitude-distribution data about the tip by synchronizing the motion data and the vibration-displacement data.

In an embodiment, the method further includes the step of drawing an amplitude color map based on the amplitude-distribution data.

In an embodiment, the time-frequency information comprises correspondence between time points, acceleration amplitudes and frequencies. Furthermore, the operation of normalizing the time-frequency information includes the step of dividing the acceleration amplitude that corresponds to each of the time points by the square of the frequency that corresponds to the time point.

In an embodiment, the motion data are obtained from a controller connected to the machine tool.

In an embodiment, the vibration acceleration data are obtained from a sensor.

The embodiment of the present disclosure assists in determining whether the defects on the surface of the workpiece is caused by the cutter-tip vibration through capturing the motion data and the vibration acceleration data about the tip of the cutter during machining and applying the method provided by the present disclosure to analyze the above two data. Through the method provided by the present disclosure, the machining defects caused by cutter-tip vibration can be intuitively identified. In this way, the processing defects of the workpiece can be quickly identified and improved during the development and proofing stages, thereby increasing business transaction opportunities and strengthening market competitiveness.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

In each of the following embodiments, the same reference numbers represent identical or similar elements or components.

Ordinal terms used in the claims, such as "first," "second," "third," etc., are only for convenience of explanation, and do not imply any precedence relation between one another.

In the following descriptions, the term "machining" refers to the process of cutting off the excess material layer on the workpiece with a tool with higher hardness to make the workpiece meet the requirements of shape, size, surface quality, etc. Typically, the workpiece is a metal material, such as a variety of steels, aluminum alloys, titanium alloys, high-temperature alloys, etc., but the present disclosure is not limited thereto. The cutting equipment for cutting the workpiece may include various types of lathes and milling machines, and the cutters acting on the surface of the workpiece are various types of lathe tools and milling cutters, but the present disclosure is not limited thereto.

Defects on the surface of the workpiece may include cracks, scratches, roughness, etc., which may, but not necessarily, result from cutter-tip vibration in the cutting equipment. The present disclosure focuses on assisting in determining whether the defects on the surface of the workpiece are caused by cutter-tip vibration.

Figure 1:
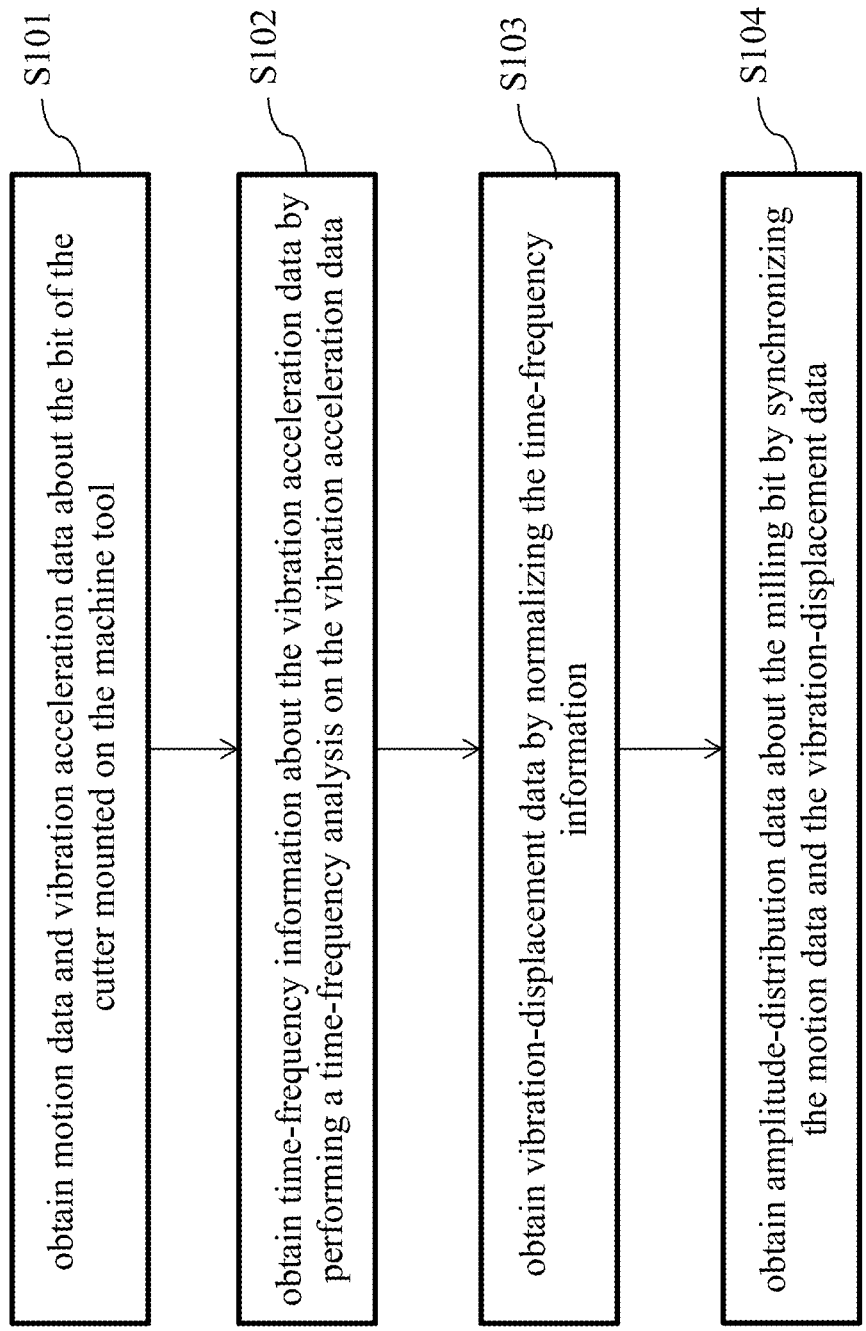
FIG. 1 is a flow diagram illustrating a method for facilitating analysis of causes of machining defects, according to an embodiment of the present disclosure.

FIG. 1 is a flow diagram illustrating a method 100 for facilitating analysis of causes of machining defects, according to an embodiment of the present disclosure. As shown in FIG. 1, the method 100 may include steps S101-S104.

The method 100 starts at step S101. In step S101, motion data and vibration acceleration data about the tip of the cutter mounted on the machine tool are obtained. Then, the method 100 proceeds to step S102.

The motion data are for describing the relationship between time and the tip displacement (i.e., displacement of the tip) of the cutter. More specifically, the motion data can record the change of the position of the tip of the cutter at each time point relative to the origin or the position at the previous time point. The origin can be the starting position of the tip of the cutter, or a selected reference position. In an embodiment, the tip displacement can be represented by a position vector in a three-dimensional Cartesian coordinate system, but the present disclosure is not limited thereto. For example, the motion data can record that the tip displacement of the cutter at time point $T_1$ is $(x_1, y_1, z_1)$, the displacement at time point $T_2$ is $(x_2, y_2, z_2)$, and the displacement at time point $T_3$ is $(x_3, y_3, z_3)$, and so forth.

The vibration acceleration data are for describing the relationship between time and the acceleration amplitude of the cutter-tip vibration. For example, the vibration acceleration data can record that the vibration acceleration amplitude of the tip at time point $T_1$ is $A_1$, the vibration acceleration amplitude of the tip at time point $T_2$ is $A_2$, and the vibration acceleration amplitude of the tip at time point $T_3$ is $A_3$, and so forth.

In step S102, time-frequency information about the vibration acceleration data is obtained by performing a time-frequency analysis on the vibration acceleration data. Then, the method 100 proceeds to step S103.

The time-frequency information may include the correspondence between time (or time point), acceleration amplitude and frequency. The correspondence between time and acceleration amplitude can be drawn as a time domain diagram. The correspondence between frequency and acceleration amplitude can be drawn as a frequency domain diagram. The correspondence between the three (i.e., time, acceleration amplitude and frequency) can be drawn as a spectrogram. However, drawing these diagrams is not necessary in the disclosed method.

In step S103, vibration-displacement data are obtained by normalizing the time-frequency information. Then, the method 100 proceeds to step S104.

The vibration-displacement data are for describing the relationship between time and the displacement amplitude of the cutter-tip vibration, wherein the displacement amplitude is equivalent to the normalized acceleration amplitude. For example, the vibration-displacement data can record the displacement amplitude at time point $T_1$ as $X_1$, the normalized acceleration amplitude at time point $T_2$ as $X_2$, the normalized acceleration amplitude at time point $T_3$ as $X_3$, and so forth.

The purpose of step S103 is described herein. In reality, it is the displacement amplitude of the cutter-tip vibration (it should be noted that the "displacement of the cutter-tip vibration" is different from the "displacement of the cutter-tip") that may directly cause the defect on the workpiece surface, rather than the acceleration amplitude. Therefore, the cause analysis based on vibration acceleration data needs further consideration to the influence of vibration frequency.

More specifically, if the displacement amplitude and the acceleration amplitude are represented by X and A respectively, then the relationship between X and A can be represented as $A=X\omega^2$, where $\omega$ is the vibration frequency. Therefore, in an embodiment of step S103, the operation of normalizing the time-frequency information is to divide the acceleration amplitude that corresponds to each of the time points by the square of the frequency that corresponds to the time point, so as to offset the effect of frequency on the cause analysis that is based on the vibration acceleration data. This allows for a more accurate assessment of the potential for the cutter-tip vibration to cause the defects on the workpiece surface. For example, underestimating the impact of low-frequency vibrations of the tip on the surface of the workpiece, and overestimating the impact of high-frequency vibrations of the tip on the surface of the workpiece, are both avoided.

In step S104, the amplitude-distribution data about the tip are obtained by synchronizing the motion data and the vibration-displacement data.

The amplitude-distribution data are for describing the relationship between the displacement amplitude and the tip displacement of the cutter. For example, assuming that at time point $T_1$, the displacement amplitude is $X_1$ and the tip displacement is $(x_1, y_1, z_1)$; at time point $T_2$, the displacement amplitude is $X_2$, and the tip displacement is $(x_2, y_2, z_2)$; at time point $T_3$, the displacement amplitude is $X_3$, and the tip displacement is $(x_3, y_3, z_3)$; . . . and so forth, then the amplitude-distribution data obtained after the synchronization process will contain the correspondence between $(x_1, y_1, z_1)$ and $X_1$, the correspondence between $(x_2, y_2, z_2)$ and $X_2$, the correspondence between $(x_3, y_3, z_3)$ and $X_3$, and so forth. In other words, when the tip displacement is $(x_1, y_1, z_1)$, the normalized acceleration amplitude of the cutter-tip vibration is $X_1$; when the tip displacement is $(x_2, y_2, z_2)$, the normalized acceleration amplitude of the cutter-tip vibration is $X_2$; when the tip displacement is $(x_3, y_3, z_3)$, the normalized acceleration amplitude of the cutter-tip vibration is $X_3$.

Since the tip of the cutter is acting on the surface of the workpiece, its motion track in space (i.e., displacement over time) will be consistent with the surface of the workpiece. Therefore, by comparing the amplitude-distribution data and the position of the defect on the surface of the workpiece, it can be determined whether the defect is caused by cutter-tip vibration. For example, if it is found that the displacement of the position of the defect on the surface of the workpiece relative to the reference point (such as the starting point of the workpiece being cut) is $(x_i, y_i, z_i)$, the displacement amplitude that corresponds to $(x_i, y_i, z_i)$ can be found out by querying the amplitude-distribution data. If the displacement amplitude is greater than a specified threshold, it can be determined that the defect is caused by cutter-tip vibration.

Figure 2:
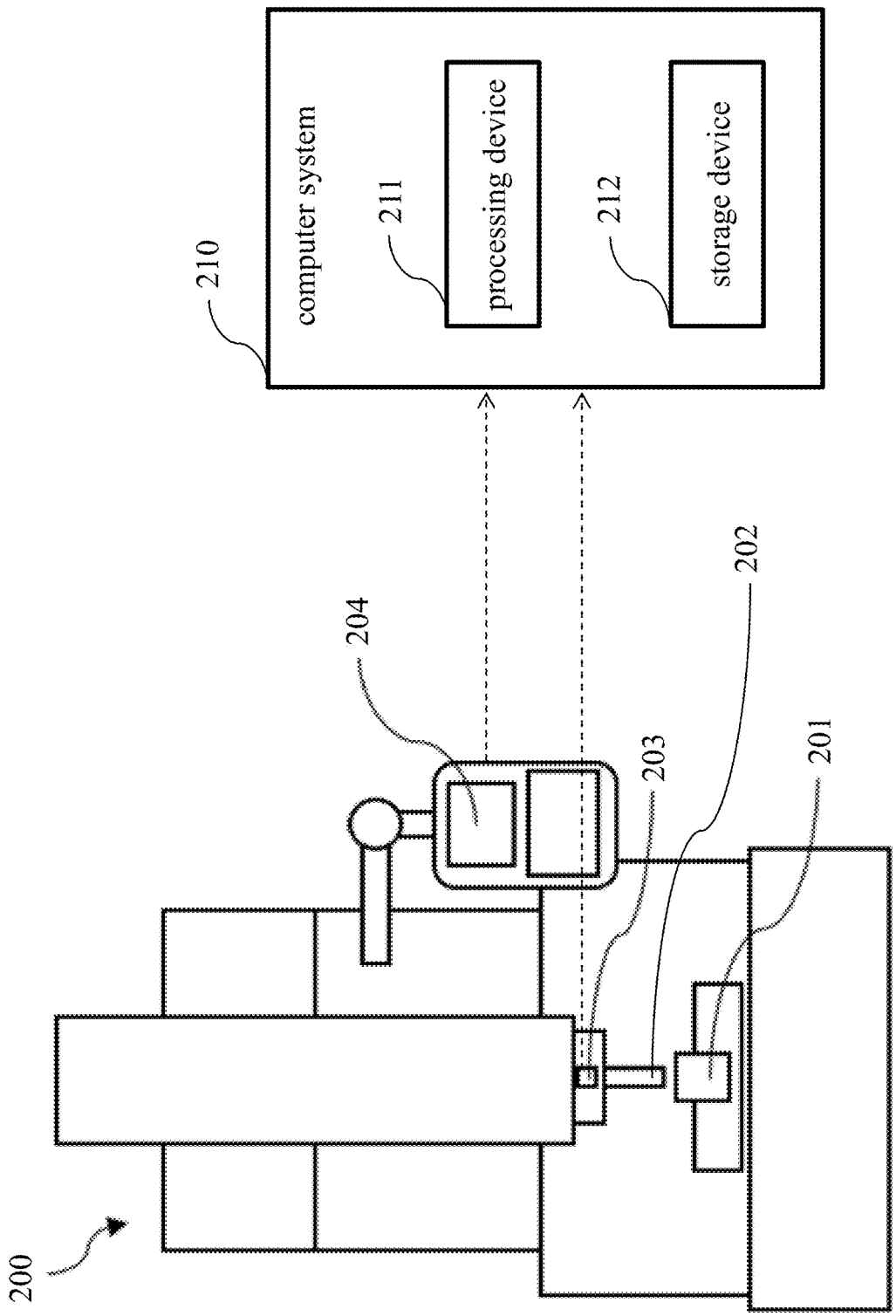
FIG. 2 shows an exemplary configuration of using a controller and a sensor to respectively capture motion data and vibration acceleration data, according to an embodiment of the present disclosure.

In an embodiment, the motion data and the vibration acceleration data can be respectively obtained from the controller and the sensor. FIG. 2 shows an exemplary configuration of using a controller and a sensor to respectively capture motion data and vibration acceleration data, according to an embodiment of the present disclosure. In the example shown in FIG. 2, the milling machine 200 is a three-axis vertical milling machine with a sensor 203, which includes a milling cutter 202 mounted on the milling machine 200 and acting on the surface of the workpiece 201, and a controller 204 used for driving the milling cutter 202 to perform the cutting operations. However, the configuration provided in FIG. 2 is by way of example only and is not intended to be limiting. In other embodiments of the present disclosure, the milling machine 200 can be replaced with any kind of machine tool, and the milling cutter 202 can be any kind of cutter mounted on the machine tool. Furthermore, the machine tool can contain the controller, or be connected to the external controller.

The sensor 203 may be a vibration sensor that uses various sensing means, such as a mechanical lever-type vibrometer or a Geiger vibrometer, an optical reading microscope or a laser vibrometer, or an electrical vibrometer, but the present disclosure is not limited thereto. The sensor 203 is attached on the milling machine 200, adjacent to the milling cutter 202, and is used for capturing the vibration acceleration data about the tip of the milling cutter 202 (i.e., the relationship between time and the acceleration amplitude of the cutter-tip vibration) during the milling machine 200 machining the workpiece 201. For example, the sensor may capture that the acceleration amplitude of the cutter-tip vibration at time point $T_1$ is $A_1$, the acceleration amplitude of the cutter-tip vibration at time point $T_2$ is $A_2$, the acceleration amplitude of the cutter-tip vibration at time point $T_3$ is $A_3$, and so forth.

The controller 204 can be a microprocessor, an embedded controller, a microcontroller, and combinations thereof, but the present disclosure is not limited thereto. The controller 204 is further configured to capture the motion data about the tip of the cutter (i.e., the relationship between the tip displacement and time) during the machining process of the workpiece 201 by the milling machine 200. For example, the controller 204 may capture that the tip displacement at time point $T_1$ is $(x_1, y_1, z_1)$, the tip displacement at time point $T_2$ is $(x_2, y_2, z_2)$, the tip displacement at time point $T_3$ is $(x_3, y_3, z_3)$, and so forth.

The data captured by the sensor 203 and/or the controller 204 can be input to a computer system 210, so that the computer system 210 can implement the method 100 of FIG. 1. The sensor 203 and/or the controller 204 can be connected to the computer system 210 in a wired or wireless manner, to transmit the captured data to the computer system 210. Alternatively, the sensor 203 and/or the controller 204 can include various memory cards to store the data captured by the sensor 203 and/or the controller 204, and the computer system 210 can obtain the data stored on the memory card through a communication interface (e.g., a USB interface).

The method 100 in FIG. 1 can be carried out by the processing device 211 of the computer system 210 through loading a program containing a plurality of instructions from the storage device 212. The processing device 211 may be any device for executing instructions, such as a central processing unit (CPU), a graphics processing unit (GPU), a microprocessor, a controller, a microcontroller, or a state machine, the present disclosure is not limited thereto. The storage device 212 can be any device that contains non-volatile memory (e.g., read-only memory, electronically-erasable programmable read-only memory (EEPROM), flash memory, non-volatile random access memory (NVRAM)), such as a hard drive disk (HDD), solid state disk (SSD), or optical disk, the present disclosure is not limited thereto. The computer system 210 can be a personal computer (e.g., a desktop computer or a notebook computer) or a server computer which run an operating system (e.g., Windows, Mac OS, Linux, UNIX, etc.), or a tablet computer or a smart phone, etc., but the present disclosure is not limited thereto.

In an embodiment, the computer system 210 may further include an output device (not shown in FIG. 2), such as a display, a printer or a speaker, to present the results obtained through implementing the method to the user. The form of presenting the results is not limited by the present disclosure.

In an embodiment, the computer system 210 may further include a communication interface (not shown in FIG. 2). The communication interface allows the computer system 210 to communicate with other devices to obtain the required data for implementing the disclosed method. The communication interface can be a wired communication interface, such as a High Definition Multimedia Interface (HDMI), a DisplayPort (DP) interface, an embedded DisplayPort (eDP) interface, a Universal Serial Bus (USB) interface, a USB Type-C interface, a Thunderbolt interface, a digital video interface (DVI), and the combinations thereof. Alternatively, the communication interface can be a wireless communication interface, such as the 5th generation (5G) wireless system, Bluetooth, WiFi, near field communication (NFC) interface, etc., but the present disclosure is not limited thereto.

Figure 3:
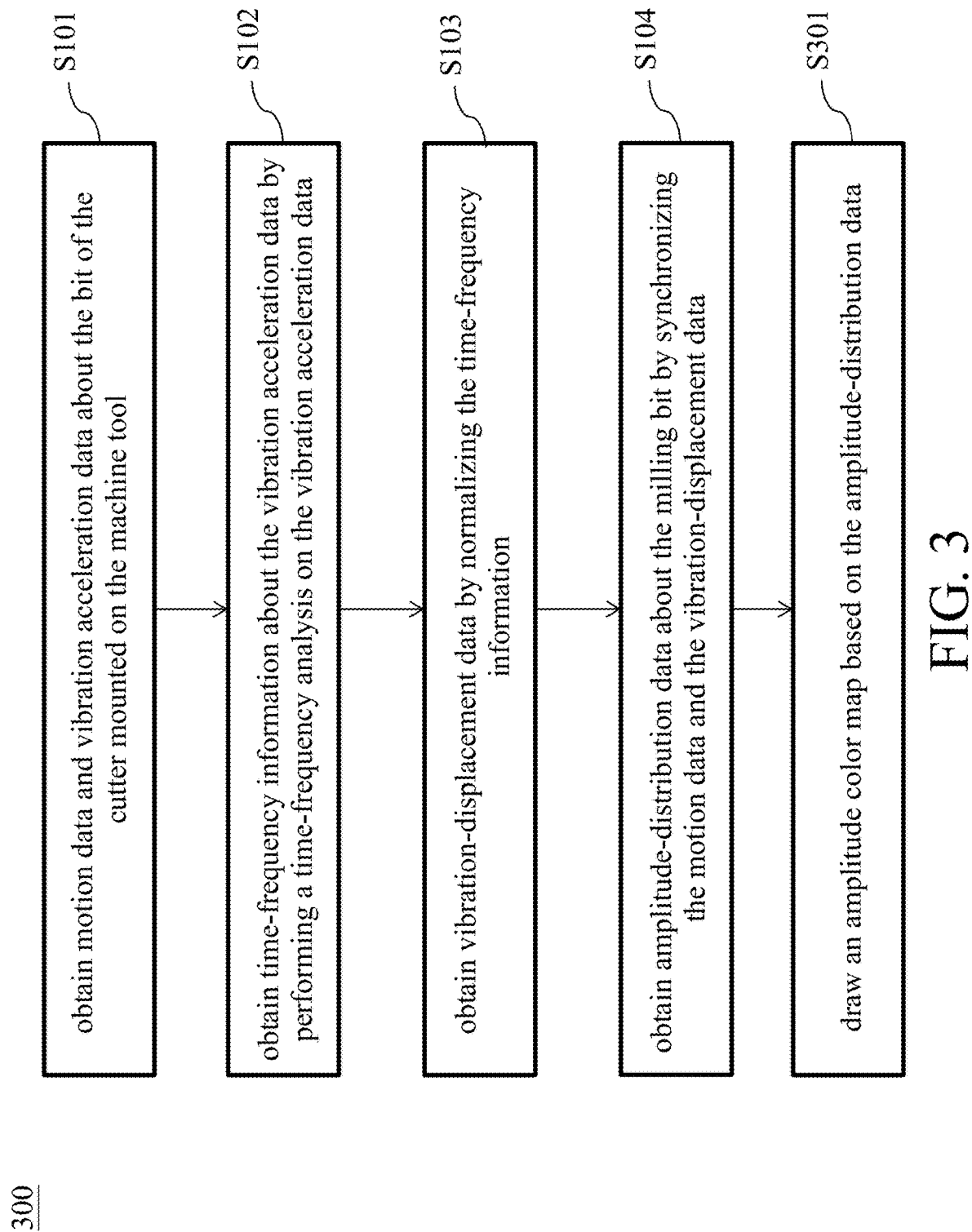
FIG. 3 is a flow diagram illustrating a method for facilitating analysis of causes of machining defects, according to an embodiment of the present disclosure.

FIG. 3 is a flow diagram illustrating a method 300 for facilitating analysis of causes of machining defects, according to an embodiment of the present disclosure. As shown in FIG. 3, compared with the method 100, the method 300 further includes step S301 after step S104.

In step S301, an amplitude color map is drawn based on the amplitude-distribution data. The amplitude color map may be a heat map with a three-dimensional shape, drawn by graphically representing the relationship between the displacement amplitude and the displacement of the tip contained in the amplitude-distribution data. As mentioned earlier, since the tip acts on the surface of the workpiece, its motion track in space (i.e., the displacement over time) will be consistent with the surface of the workpiece, so the shape of the drawn amplitude color map will also be consistent with the workpiece of the surface.

Figure 4:
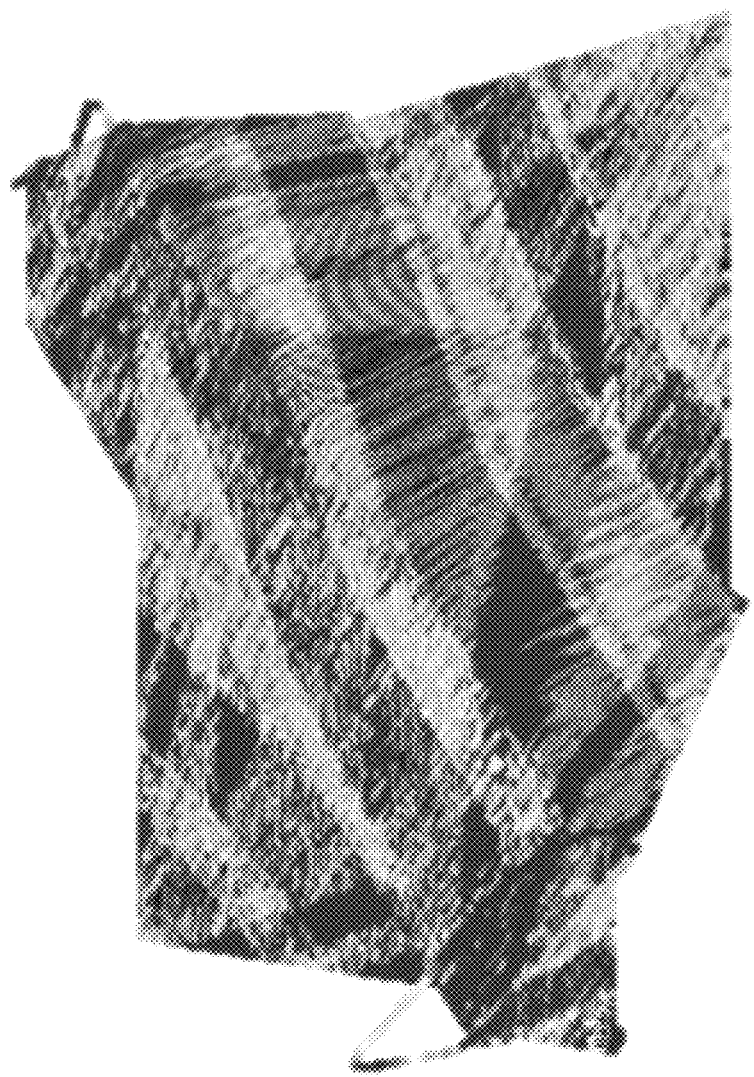
FIG. 4 shows an example of an amplitude color map, according to an embodiment of the present disclosure.

FIG. 4 shows an example of an amplitude color map 400, according to an embodiment of the present disclosure. As shown in FIG. 4, the amplitude color map 400 exhibits a shape consistent with the surface of the workpiece. In this example, points on the amplitude color map 400 has different colors, representing the magnitude of the displacement amplitude of the cutter-tip vibration at the corresponding point on the surface of the workpiece. A point with a large displacement amplitude may be in a warm color, and a point with a small displacement amplitude may be in a cool color (but the present disclosure is not limited thereto). Therefore, by comparing the amplitude color map with the actual workpiece, it can be intuitively determined whether the defects on the surface of the workpiece are caused by cutter-tip vibration.

The methods described above can be carried out using computer-executable instructions. These instructions may include, for example, instructions and data that cause a general purpose computer, special purpose computer, or special purpose processing device to perform a specific feature or group of features. Some of the computer resources used can be accessed via the net. For example, computer-executable instructions may be binary or intermediate format instructions, such as assembly language, firmware, or source code.

The embodiment of the present disclosure assists in determining whether the defects on the surface of the workpiece is caused by the cutter-tip vibration through capturing the motion data and the vibration acceleration data about the tip of the cutter during machining and applying the method provided by the present disclosure to analyze the above two data. Through the method provided by the present disclosure, the machining defects caused by cutter-tip vibration can be intuitively identified. In this way, the processing defects of the workpiece can be quickly identified and improved during the development and proofing stages, thereby increasing business transaction opportunities and strengthening market competitiveness.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for facilitating analysis of causes of machining defects, carried out by a computer system, the method comprising:

obtaining motion data and vibration acceleration data about a tip of a cutter mounted on a machine tool;

obtaining time-frequency information about the vibration acceleration data by performing a time-frequency analysis on the vibration acceleration data;

obtaining vibration-displacement data by normalizing the time-frequency information; and obtaining amplitude-distribution data about the tip by synchronizing the motion data and the vibration-displacement data.

2. The method as claimed in claim 1, further comprising: drawing an amplitude color map based on the amplitude-distribution data.

3. The method as claimed in claim 1, wherein the time-frequency information comprises correspondence between time points, acceleration amplitudes and frequencies; and wherein the operation of normalizing the time-frequency information comprises: dividing the acceleration amplitude that corresponds to each of the time points by the square of the frequency that corresponds to the time point.

4. The method as claimed in claim 1, wherein the motion data are obtained from a controller connected to the machine tool.

5. The method as claimed in claim 1, wherein the vibration acceleration data are obtained from a sensor.

* * * * *